Jan. 1, 1946.  J. C. HOBBS  2,391,898
HIGH PRESSURE CONTROL VALVE
Filed June 15, 1943
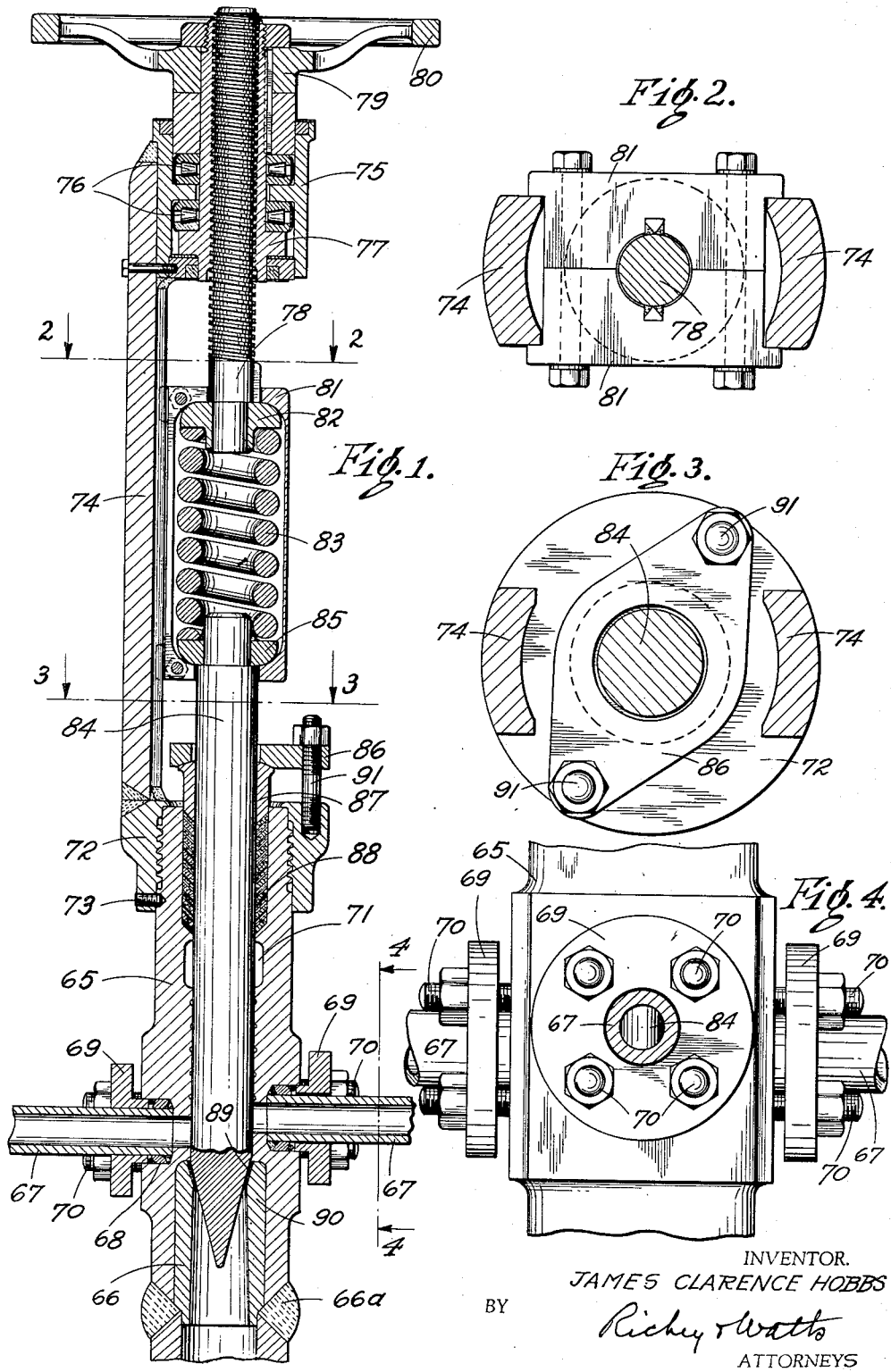
INVENTOR.
JAMES CLARENCE HOBBS
BY
Richey + Watts
ATTORNEYS Patented Jan. 1, 1946

2,391,898

UNITED STATES PATENT OFFICE 2,391,898

HIGH-PRESSURE CONTROL VALVE

James Clarence Hobbs, Painesville, Ohio

Application June 15, 1943, Serial No. 490,911

1 Claim. (Cl. 251—49)

This invention relates to fluid valves and more particularly to valves for use with fluids under high pressure, for example, high temperature high pressure steam or medium temperature water under high pressure. Altho the present invention is particularly adapted for fluid pressures on the order of 2500 pounds per square inch, it is also suitable for pressures down to 1000 pounds per square inch or lower.

Prior to the present invention the valves which were available for high pressure fluids were generally similar in design to the valve previously used for much lower pressures, the main difference being that the parts of the older valves were greatly enlarged to make them strong enough to withstand the higher pressures. In other words, the design of the high pressure valves available on the market now is more or less orthodox and involves no fundamental differences over the long used low pressure valves and include no particular means, except heavier metal parts, for meeting the needs peculiar to control of fluids under high pressures.

The present day high pressure valves possess a number of important disadvantages. They are composed of large, heavy metal parts and, therefore, are uneconomical as regards the space required, the supports required to support their weight, and the large amount of metal which is present in their construction. Any decrease which is possible in the size, weight and amount of metal employed in high pressure valves is quite important because of the resultant saving in space, in supporting means and in cost of metal, and in reduction of temperature differentials and corresponding stresses.

The valve bodies of the present-day high pressure valves are provided with large flanges around some of, or all, the openings, particularly the opening which receives the valve unit and usually at the openings where pipe connections are to be made. The parts which are to be connected to such flanges are likewise flanged. Gaskets are used between two opposed flanges to seal the opening and a large number of good sized bolts spaced short distances apart are relied on to compress the gasket and prevent escape of high pressure fluid between the flanges. Not only is this construction unduly heavy but it is not safe when in use. Since the pressure area of the valve body opening is much smaller than that of the gasket or sealing area, and since the load varies directly as the square of the diameter of the sealing area, the load which bolts must carry is greater than the actual load on the valve body. It is necessary, therefore, to provide flanges and bolts which will withstand this increased load, and to place the flange bolts as close together as possible, for the load must be carried by the tensile strength of the bolts. If the load is sufficient to stretch the bolts even slightly, the high pressure fluid may escape past the gasket, and if it is sufficiently high to exceed the ultimate strength of the bolts and break them, the entire valve fails and may result in injury to workmen as well as the shutting down of a power plant costing millions of dollars.

Moreover, such a construction does not permit any relative expansive and contractive movement of one valve part relative to another with temperature changes, and since the valve parts are not subjected to equal and simultaneous heating and cooling, considerable variation in the sizes of the two adjacent parts is common. For example, when high pressure fluid is admitted into a flanged valve body, the body will expand at a rate different from that of a flanged connection at the valve unit opening. Such differential expansion can take place in present day valves only by deflection of the weaker of two differently expansible elements or parts. While present-day valve constructions may permit such deflections at lower temperatures, it seems that there is a limit around 400° F. differential temperature beyond which either the joints become leaky or the bolts become overstrained or broken when differential expansion occurs.

Other disadvantages will be pointed out hereinafter. The present invention aims to avoid the many disadvantages and shortcomings of the present-day high pressure valves and, in contrast with such valves, to provide a valve construction which is characterized by being relatively small in size and light in weight and containing a small amount of metal; by being safe, reliable and easy to operate in handling fluids under pressures of as much as 2500 pounds per square inch or more, and temperatures of several hundred degrees F.; by requiring a small amount of time for assembly, disassembly, installation, inspection, maintenance and repair; by being free from all, or substantially all, flanges, flange bolts and flange gaskets; by having a small area subjected to internal pressures with the resultant low stresses in the sealing elements; by being capable of differential expansion and contraction in the various parts under varying temperature conditions; by having sealing means whose sealing action varies with the pressure of the fluid to be sealed; and in general by being simplified and yet adapted to meet the severe conditions to which it is subjected in the control of high pressure high temperature fluids as well as to control fluids of lower temperatures or pressures.

In the drawing accompanying and forming a part of this specification:

Fig. 1 is a central, longitudinal, cross-sectional view of a control valve embodying the present invention, one arm of the yoke being omitted;

Figs. 2, 3 and 4 are, respectively, cross-sectional views, partly in elevation, taken on lines 2—2, 3—3 and 4—4 of Fig. 1.

In Fig. 1 the valve body 65 is tubular, is free from outwardly projecting flanges, and has walls which are uniform in thickness except where outlet openings are provided. This body 65 has side walls of approximately equal thickness and, therefore, equal expansibility, and is free from projecting portions which might set up differential stresses under widely varying temperature conditions. It is shown as being cylindrical but may have other cross-sectional shapes within the meaning of the word "tubular." The body 65 is provided with a passage extending completely therethru. At one end of the body, that is, the opening thru which high pressure fluid enters the body, an elongated tubular valve seat 66 is disposed and is secured in place by any suitable means, but preferably, as shown, by having its outer end attached to the adjacent end of the body as by weld metal 66a.

This body 65 is provided with a plurality of outlet openings (in this instance four) each of which is provided with pipe connection 67, packing 68 and glands which are secured to the body by bolts 70. It is not necessary that the center lines of all these outlets be located in the same transverse plane, and when they are located in different planes, fluid may be admitted to one or more outlets before it is admitted to the remaining outlet or outlets.

The central passage of the valve body 65 beyond the openings to pipe connections 67, here indicated generally by numeral 71, receives a valve unit which, as shown, comprises several parts including a bonnet, valve stem, valve-actuating means and packing means.

The bonnet includes a ring 72 which is screw-threaded to the outside of the valve body at the end of opening 71 and may be held in adjusted position by set-screw 73. This ring 72 carries a yoke including a pair of legs 74 which support a housing 75 within which are located thrust bearings 76. A flanged sleeve 77 is interiorly threaded to a rod 78 and extends thru and is keyed to the hub 79 of handwheel 80. The lower end of rod 78 extends into the space within a crosshead 81 which is composed of two similar blocks and which carries spring washers 82 and 85 which bear against opposite ends of coil spring 83 in the crosshead. The valve stem 84, which projects at its upper end into crosshead 81, engages with spring washer 85 on the lower end of spring 83. The stem 84 extends thru a gland yoke 86, a packing 87, packing rings 88, has sliding engagement in opening 71 and at its lower end is tapered to form a seating surface 89 to cooperate with a correspondingly shaped seating surface 90 on the inner end of valve seat 66. The gland yoke 86 is attached to ring 72 as by studs 91 which may be tapped into the ring.

It will be understood that when the handwheel 80 rotates the sleeve 77 the rod 78 will be moved endwise, thereby compressing spring 83 or permitting it to expand, depending upon the direction of movement of the rod 78 and thereby moving crosshead 81 along the legs 74. When the rod 78 is moved downwardly in Fig. 1 stem 84 will be moved toward seating position on valve seat 66, and when stem 78 is moved upwardly in Fig. 1 the crosshead 81 will be moved in the same direction together with valve stem 84, thereby moving the stem out of seating engagement with valve seat surface 90 and permitting fluid under pressure to enter thru the valve seat and pass out thru one or more of the outlet connections 67.

It will be understood from the accompanying drawing and the foregoing description that the present invention possesses many new and novel features and advantages. Valves embodying this invention are relatively quite small as compared with prior valves, even those devised for much lower pressures and hence require much less space than the prior valves. Furthermore, the present valves contain much less metal and are, therefore, lighter in weight and less expensive in metal cost than prior valves and require lighter and less expensive supports. Moreover, the side walls of the present valves are sufficiently thick to easily withstand the pressures involved and, where changes in thickness occur, the change is made gradually so as not to result in a weakened structure or in use of undue amount of metal to overcome weaknesses due to abrupt changes in thickness.

The valves of the present invention combine safety, reliability and ease of operation in handling pressures as high as twenty-five hundred (2500) pounds per square inch or more at temperatures of several hundred degrees Fahrenheit, for they are strong enough to resist breakage in use, they employ novel packing means which insure reliability in sealing such fluids, the actuation of the valves is not hampered by distortion of the parts and the fluid pressure may be employed to assist in actuation of the valves.

The valves of this invention may be assembled, disassembled, installed, inspected, maintained and repaired readily and quickly largely because of the new and novel construction and arrangement of valve parts. A plurality of valve parts are combined in a unit which may be assembled with or disassembled from the valve body in a very short period of time. The new and novel manner of sealing the valve and valve unit is not only highly efficient but is removable as a part of the valve unit.

Another highly important feature of the present invention is that the valves may be entirely free from all flanges, flange bolts and flange gaskets and the areas which must be sealed and which are subjected to internal pressures are much smaller in contrast to those in prior valves with the result that the sealing of such areas is simplified and improved. In addition, the present invention provides sealing and packing which is compressed by the fluid pressure and the sealing effect of such packing is increased as the pressure to be sealed increases.

Another important feature of the present invention is that it provides for differential expansion and contraction of parts of the valve which are subjected to heating and cooling at different rates. Since the parts can expand and contract independently of each other many stresses of the prior valves are thereby avoided.

This application is a continuation-in-part of my copending application Ser. No. 320,476, which issued on June 15, 1943, as Patent 2,321,597. Other subject-matter shown but not claimed in that application or in this application is being claimed in my copending applications Ser. No. 490,912 and Ser. No. 490,913.

Having thus described the invention so that others skilled in the art may be able to understand and practice the same, I state that what I desire to secure by Letters Patent is defined in what is claimed.

What is claimed is:

A high pressure valve comprising a valve body having inlet and outlet openings, a valve seat for one of said openings and a cylindrical portion provided with a valve stem opening opposed to said seat, a valve stem in said opening and having an outer end, a spring bearing block on said outer end of the stem, a fixed yoke having a cylindrical portion at one end engaging and connected to said cylindrical body portion thruout substantially its full circumferential length and having a cylindrical housing at its other end, a rod axially aligned with said stem and having a spring bearing block on its end adjacent to said stem, a spring compressed between said blocks, a reciprocable cross-head about said blocks and spring and having longitudinal guiding, rotation preventing, engagement with said yoke, and means operatively associated with said housing and stem to reciprocate the latter axially in said opening.

JAMES CLARENCE HOBBS.